United States Patent
Saito et al.

(10) Patent No.: US 8,428,823 B2
(45) Date of Patent: Apr. 23, 2013

(54) STEERING CONTROL DEVICE AND STEERING CONTROL METHOD FOR WORKING VEHICLE

(75) Inventors: Yoshiaki Saito, Kawaguchi (JP); Kentarou Itou, Sakura (JP)

(73) Assignee: Komatsu Ltd., Tokyo (JP)

( * ) Notice: Subject to any disclaimer, the term of this patent is extended or adjusted under 35 U.S.C. 154(b) by 399 days.

(21) Appl. No.: 12/736,402

(22) PCT Filed: Apr. 16, 2009

(86) PCT No.: PCT/JP2009/001752
§ 371 (c)(1),
(2), (4) Date: Oct. 5, 2010

(87) PCT Pub. No.: WO2009/130866
PCT Pub. Date: Oct. 29, 2009

(65) Prior Publication Data
US 2011/0029199 A1 Feb. 3, 2011

(30) Foreign Application Priority Data
Apr. 25, 2008 (JP) .................................. 2008-115089

(51) Int. Cl.
*A01B 69/00* (2006.01)
(52) U.S. Cl.
USPC .............................................. 701/41; 701/42
(58) Field of Classification Search ............... 701/41–42
See application file for complete search history.

(56) References Cited

U.S. PATENT DOCUMENTS

| | | | |
|---|---|---|---|
| 6,856,869 B2 * | 2/2005 | Takahashi ........................ | 701/41 |
| 7,873,453 B2 * | 1/2011 | Kobayashi et al. .............. | 701/41 |
| 2005/0205345 A1 * | 9/2005 | Hayashi ........................ | 180/446 |
| 2006/0015230 A1 * | 1/2006 | Mitsuhara ........................ | 701/42 |
| 2009/0048735 A1 * | 2/2009 | Guegan ........................... | 701/42 |
| 2009/0192679 A1 * | 7/2009 | Kobayashi et al. ............. | 701/42 |

FOREIGN PATENT DOCUMENTS

| | | |
|---|---|---|
| JP | 63-306974 A | 12/1988 |
| JP | A-6-281539 | 10/1994 |
| JP | 08-175219 A | 7/1996 |
| JP | 09-193826 A | 7/1997 |
| JP | 10-278831 A | 10/1998 |
| JP | 11-107800 A | 4/1999 |
| JP | 2000-072025 A | 3/2000 |

(Continued)

OTHER PUBLICATIONS

International Search Report mailed on Jul. 14, 2009 for the corresponding International patent application No. PCT/JP2009/001752 (English translation enclosed).

(Continued)

*Primary Examiner* — Hussein A. Elchanti
(74) *Attorney, Agent, or Firm* — Posz Law Group, PLC

(57) ABSTRACT

A stationary steering operation determination means determines whether or not stationary steering operation is being performed repeatedly at a determination cycle period that is set to be longer than a cycle period at which a certain signal is detected. And a stationary steering operation determination means makes a decision as to whether or not stationary steering operation is being performed, on the basis of vehicle speed as detected by a vehicle speed detection means and steering angle as detected by a steering angle detection means. If it has been determined that stationary steering operation is being performed, a steering sensitivity alteration means decreases the steering sensitivity by reducing a pilot pressure or the like. And a notification means notifies the operator that stationary steering operation is being performed.

19 Claims, 12 Drawing Sheets

FOREIGN PATENT DOCUMENTS

| | | |
|---|---|---|
| JP | 2001-294181 A | 10/2001 |
| JP | 2006-107027 A | 4/2006 |
| JP | 2007-020354 A | 1/2007 |
| JP | 2007-279886 A | 10/2007 |

OTHER PUBLICATIONS

Office Action dated Sep. 4, 2012 issued in corresponding JP Application No. 2010-509066.

\* cited by examiner

FIG.1
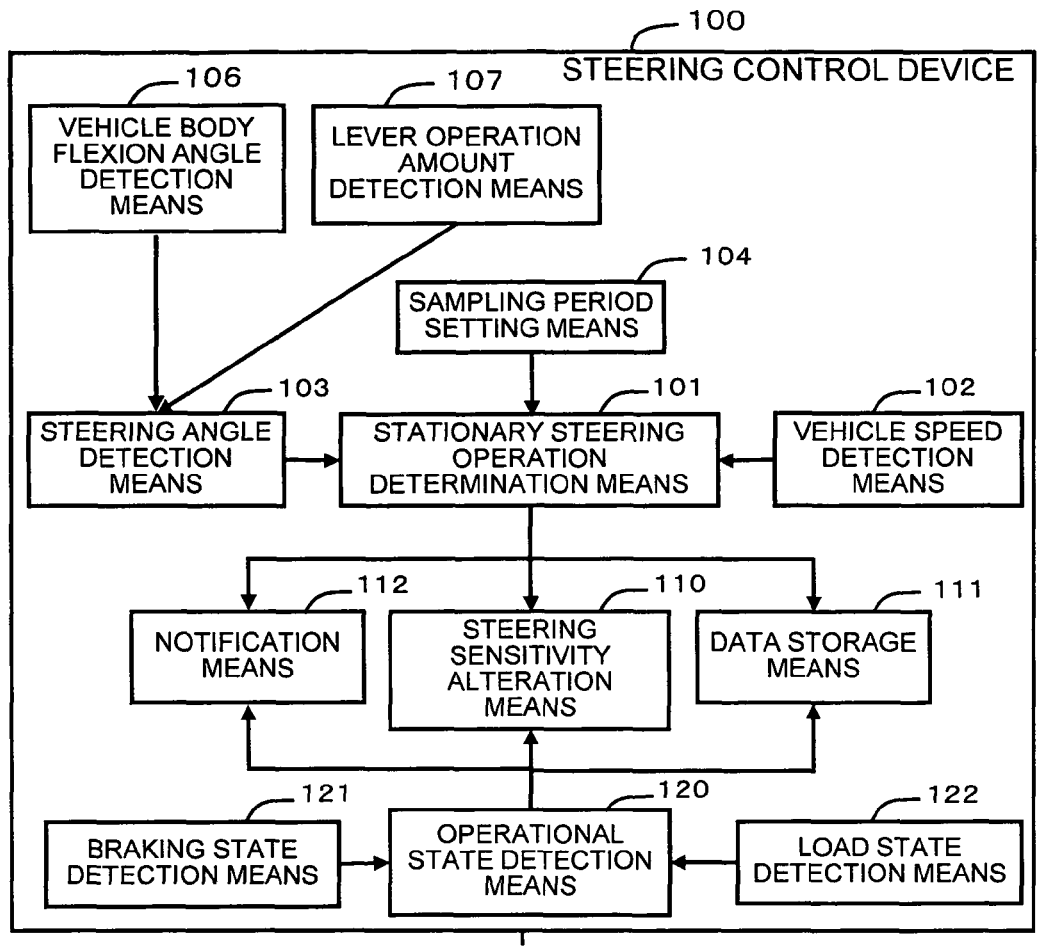
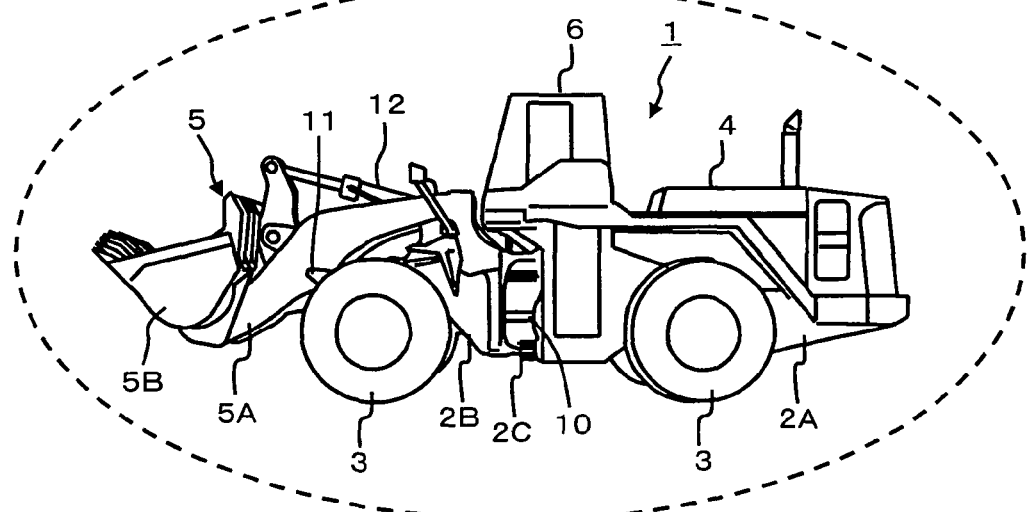

FIG.11

| STEERING SENSITIVITY CONTROL TABLE | T30 |
|---|---|
| LEVEL | REDUCTION AMOUNT FOR STEERING SENSITIVITY |
| LEVEL #1 | REDUCE PILOT PRESSURE TO 1/3 |
| LEVELS #2 AND #3 | REDUCE PILOT PRESSURE TO 1/2 |
| LEVEL #4 | REDUCE PILOT PRESSURE TO 2/3 |

STEERING CONTROL DEVICE AND STEERING CONTROL METHOD FOR WORKING VEHICLE

CROSS REFERENCE TO RELATED APPLICATIONS

This application is a U.S. national stage application of PCT/JP2009/001752 filed on Apr. 16, 2009, and claims priority to, and incorporates by reference, Japanese Patent Application No. 2008-115089 filed on Apr. 25, 2008.

TECHNICAL FIELD

The present invention relates to a steering control device and a steering control method for a working vehicle.

BACKGROUND ART

In a working vehicle such as, for example, a wheel loader, a front vehicle body portion and a rear vehicle body portion are flexibly linked together, and a construction machine that consists of a bucket or the like is provided to the front vehicle body portion. The operator digs up earth or sand or the like to fill the bucket, and loads it into a vehicle such as a dump truck or the like. While performing this type of work, sometimes the operator causes the steering to perform stationary steering operation. Stationary steering operation means that, in the state in which the working vehicle is stationary, the steering is greatly operated in either the left or the right direction.

When stationary steering operation of the steering is being performed, the life of the tires becomes short because the tires wear. Since the tires that are used on a wheel loader are comparatively high in price, the maintenance cost of the wheel loader increases if the tire life decreases.

In particular, in the case of a large sized wheel loader, the weight of the front vehicle body portion can easily become great, in order for it to be possible to charge a large amount of load into the bucket. Accordingly, if stationary steering operation of the steering is performed, sometimes it happens that the tires wear remarkably.

Although these are not technologies related to working vehicles such as wheel loaders or the like, it should be understood that a technique is known (Patent Document #1) of, during stationary steering operation of the steering, controlling the intake air amount and the fuel injection amount according to the load; and a technique is known (Patent Document #2) of, during steering stationary steering operation, operating a motor to support this stationary steering operation.

PRIOR ART DOCUMENTS

Patent Documents

Patent Document #1: Japanese Laid-Open Patent Publication Heisei 11-107800.
Patent Document #2: Japanese Laid-Open Patent Publication Heisei 9-193826.

SUMMARY OF THE INVENTION

Problems to be Solved by the Invention

In relation to a working vehicle such as a wheel loader, no means is known for stably detecting stationary steering operation of the steering. Furthermore, in the above described prior art technique related to a general vehicle or an electrically operated golf cart, since the wear upon the tires due to stationary steering operation is comparatively small, the engine and the motor are controlled so as to perform stationary steering operation smoothly, rather than so as to prohibit stationary steering operation.

Accordingly, in the prior, art technology, when stationary steering operation of the steering is detected, support is given to performing stationary steering operation smoothly, and not to suppressing stationary steering operation. However, in the case of a working vehicle, when the steering is being operated in the stationary steering mode, the tires wear undesirably, and the cost of maintenance increases.

Furthermore, while the amount of wear upon the tires varies depending upon the operational state when stationary steering operation is being performed, in the prior art, there is no disclosure related to the aspect of suppressing stationary steering operation in consideration of the operational state during stationary steering operation.

The present invention has been conceived in view of the problems described above, and its object is to provide a steering control device and a steering control method for a working vehicle, that can appropriately detect stationary steering operation of the steering. Another objective of the present invention is to provide a steering control device and a steering control method for a working vehicle, with which it is possible to suppress stationary steering operation of the steering by automatically changing the steering sensitivity when stationary steering operation of the steering has been detected. Yet further objectives of the present invention will become clear from the subsequent description of embodiments thereof.

Means for Solving the Problems

In order to solve the problems described above, according to the present invention, a steering control device of a working vehicle that controls the steering operation of a working vehicle comprises: a vehicle speed detection means that detects the vehicle speed repeatedly at a first sampling period that is set in advance; a steering angle detection means that detects the steering angle repeatedly at a second sampling period that is set in advance; and a stationary steering operation determination means for making a decision as to whether or not the steering is being operated in stationary steering mode, that makes its decision as to operation in stationary steering mode on the basis of the vehicle speed and the steering angle repeatedly at a third sampling period that is set longer than the first sampling period and the second sampling period.

There may also be further included a steering sensitivity alteration means for changing the sensitivity of steering operation, where the steering sensitivity alteration means decreases the sensitivity of steering operation when it has been decided by the stationary steering operation determination means that stationary steering operation is taking place.

There may also be further included an operational state detection means for detecting the operational state, when it has been decided by the stationary steering operation determination means that stationary steering operation is taking place.

The steering angle detection means may be either a vehicle body flexion angle detection means for detecting flexion of the vehicle body, or a lever operation amount detection means for detecting the operation amount of a steering lever.

There may also be further included a data storage means for storing the decision result of the stationary steering operation determination means.

There may also be further included a notification means for issuing an alarm if it has been decided by the stationary steering operation determination means that stationary steering operation is taking place.

There may also be further included an operational state detection means that, when it has been decided by the stationary steering operation determination means that stationary steering operation is taking place, detects to which of a plurality of subdivisions that are set in advance the operational state belongs, on the basis of the operational state of a brake and the load weight; and a steering sensitivity alteration means that reduces the sensitivity of steering operation according to the operational state, by reducing either or both of the discharge flow rate of a steering pump, or a pilot pressure for controlling a steering valve.

And, according to yet another aspect of the present invention, a steering control method that controls the steering operation of a working vehicle comprises a vehicle speed detection means that detects the vehicle speed repeatedly at a first sampling period that is set in advance, and a steering angle detection means that detects the steering angle repeatedly at a second sampling period that is set in advance, and therein are executed: a step of making a decision as to whether or not a third sampling period that is set longer than the first sampling period and the second sampling period has elapsed; a step of, when the third sampling period has elapsed, making a decision as to whether or not the vehicle speed being detected by the vehicle speed detection means is less than or equal to a reference vehicle speed that is set in advance; a step of, when the third sampling period has elapsed, making a decision as to whether or not the steering angle being detected by the steering angle detection means is changing by greater than or equal to a reference angle that is set in advance; and a step of deciding that stationary steering operation is being performed, if it has been decided that the vehicle speed is less than or equal to the reference vehicle speed and moreover the steering angle is greater than or equal to the reference angle.

Advantages of the Invention

According to the present invention, it is possible to make the decision as to whether or not operation in stationary steering mode is taking place, on the basis of the vehicle speed and the steering angle, repeatedly at the third sampling period that is set to be longer than the first sampling period and the second sampling period.

According to the present invention, it is possible to decrease the sensitivity of the steering operation, if it has been decided by the stationary steering operation determination means that stationary steering operation is taking place.

According to the present invention, it is possible to detect the operational state, if it has been decided that stationary steering operation is taking place.

BRIEF DESCRIPTION OF THE DRAWINGS

FIG. 1 is an explanatory figure showing an overall summary of an embodiment;

FIG. 11 is an explanatory figure showing a table for decreasing steering sensitivity according to operational state.

PREFERRED MODES FOR IMPLEMENTATION OF THE INVENTION

Figure 2:
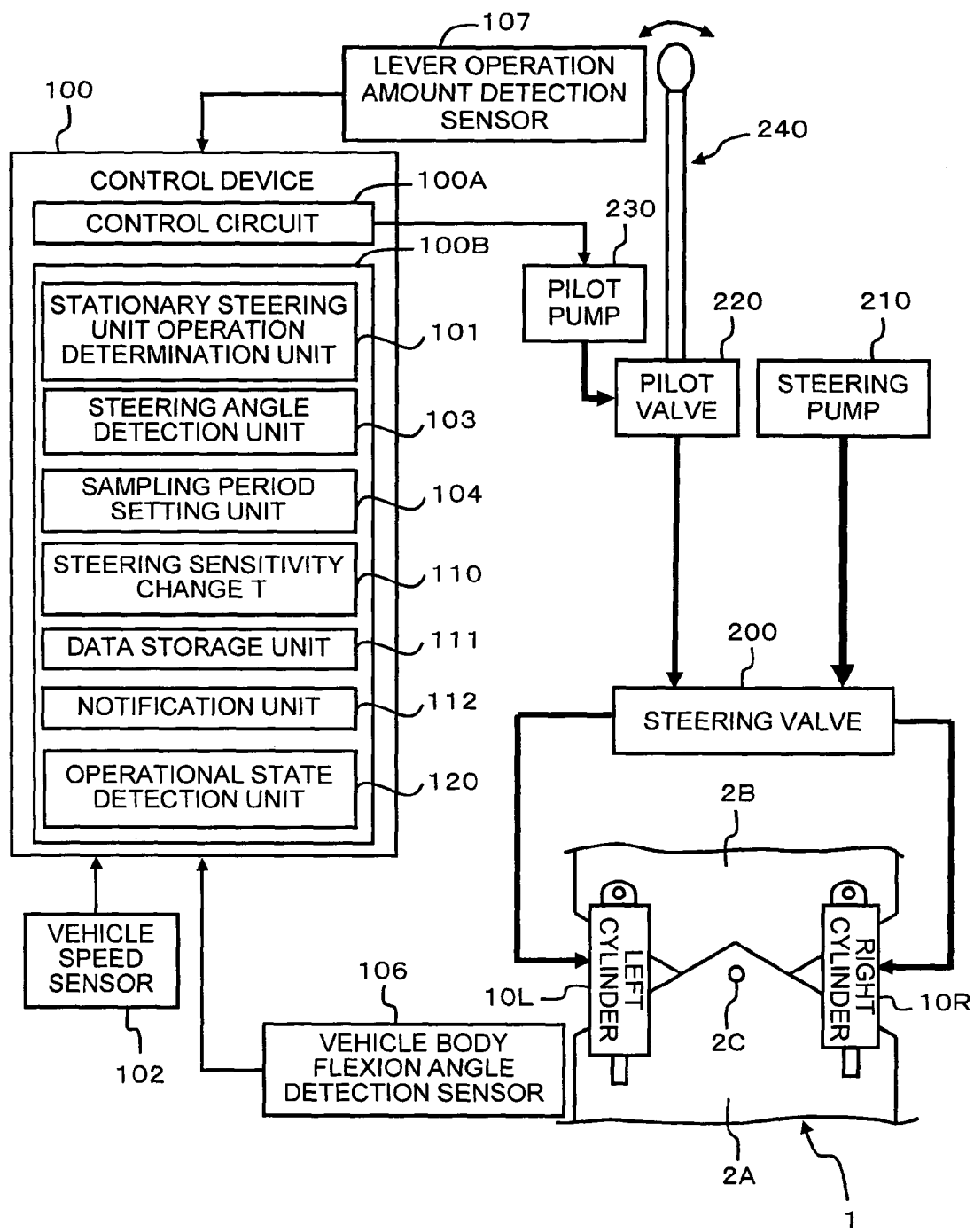
FIG. 2 is an explanatory figure showing the structure of a steering device.

Embodiments of the present invention will now be explained in the following in detail with reference to the drawings. In these embodiments, as described below, a decision is made automatically as to whether or not the steering of the wheel loader is performing stationary steering operation or not, according to a cycle for determination whose period is different from the period of a cycle for signal detection. Moreover, in these embodiments, if it has been determined that the steering is performing stationary steering operation, predetermined processing is executed for suppressing this stationary steering operation. As this predetermined processing, for example, processing to decrease the steering sensitivity, processing to gather and store data related to stationary steering operation, processing to issue an alarm related to stationary steering operation, and the like may be mentioned, as will be described hereinafter.

Embodiment 1

In the following, embodiments of the present invention will be explained by giving examples of cases in which they are applied to a wheel loader 1, which is mentioned as a typical working vehicle. However, these embodiments are not limited to a wheel loader; for example, it would also be possible to apply them to some other type of working vehicle, such as, for example, a motor grader or the like.

FIG. 1 is an explanatory figure showing the functional structure of a steering controller 100 that is provided to this wheel loader 1. First the wheel loader 1 will be explained, and then the steering controller 100 will be explained. The detailed construction thereof will be described hereinafter with reference to other figures.

This wheel loader 1 comprises a vehicle body 2 (the elements 2A through 2C are collectively referred to as the vehicle body 2), pairs of tires 3 that are provided at the front and rear and left and right of the vehicle body 2, a machine compartment 4, a working machine 5, and a driver's cabin 6, all of which will be individually described hereinafter. The vehicle body 2, for example, may comprise a rear vehicle body portion 2A, a front vehicle body portion 2B that is provided in front of the rear vehicle body portion 2A, and a link portion 2C that links the rear vehicle body portion 2A and the front vehicle body portion 2B so that they can pivot.

A pair of left and right steering cylinders 10 are provided between the rear vehicle body portion 2A and the front vehicle body portion 2B. When the operator actuates a steering lever 240 within the driver's cabin 6 (refer to FIG. 2), according to this actuation, the cylinder rod of one of these steering cylinders 10 protrudes, while the cylinder rod of the other steering cylinder 10 retracts. Due to this, the wheel loader 1 is able to change its path of progression.

The machine compartment 4 may contain, for example, an engine, a steering pump 210, a pilot pump 230 (all to be seen in FIG. 2) and so on.

The working machine 5 comprises a boom 5A that is rotatably provided so as to extend forward from the front vehicle body portion 2B, a bucket 5B that is rotatably provided at the end of the boom 5A, a boom cylinder 11 for rotating the boom 5A in the upward and downward direction, and a bucket cylinder 12 for rotating the bucket 5B.

The driver's cabin 6 is provided at the front side of the rear vehicle body portion 2A. A steering device for steering the wheel loader 1, a seat, control devices, and so on are provided within this driver's cabin 6.

A steering controller 100 is provided to this wheel loader 1. This steering controller 100 may comprise, for example, a stationary steering operation determination means 101, a vehicle speed detection means 102, a steering angle detection means 103, a sampling period setting means 104, a vehicle body flexion angle detection means 106, a lever operation amount detection means 107, a steering sensitivity alteration means 110, a data storage means 111, a notification means 112, an operational state detection means 120, a braking state detection means 121, a load state detection means 122, all of which will be described in detail hereinafter.

The vehicle speed detection means 102 detects the speed of this wheel loader 1 at a predetermined sampling period of, for example, 10 msec, and outputs the result as an electrical signal. The steering angle detection means 103 detects the steering angle at a predetermined sampling period of, for example, 10 msec, and outputs the result as an electrical signal. And the sampling period setting means 104 sets a determination period for determination by the stationary steering operation determination means 101.

And, at this determination period set by the sampling period setting means 104, on the basis of the vehicle speed and the steering angle, the stationary steering operation determination means 101 determines whether or not the steering of the wheel loader 1 is being operated in stationary steering mode.

The vehicle body flexion angle detection means 106 detects the angle between the rear vehicle body portion 2A and the front vehicle body portion 2B, and outputs the detected angle as an electrical signal. And the lever operation amount detection means 107 outputs the operation amount of the steering lever 240 as an electrical signal.

The value of either one of the vehicle body flexion angle or the steering lever operation amount may be used as the steering angle. In the example shown in FIG. 1, while both the vehicle body flexion angle and the lever operation amount are inputted to the steering angle detection means 103, the steering angle detection means 103 detects the steering angle of the wheel loader 1 on the basis of either one of the vehicle body flexion angle or the lever operation amount.

The vehicle body flexion angle is the steering angle that is actually generated due to steering operation. By contrast, the lever operation amount is the steering angle that it is required to attempt to implement from now onwards. Accordingly, if the steering angle is detected on the basis of the lever operation amount, then this may be termed pre-detection of the steering angle.

The steering sensitivity alteration means 110 is an element that changes the sensitivity when the steering is actuated from a reference value. As will be described hereinafter, this steering sensitivity alteration means 110 decreases the sensitivity of the steering operation when stationary steering operation is taking place. by thus decreasing the steering sensitivity, it is possible to suppress stationary steering operation, and it is possible to reduce the amount of wear upon the tires 3.

When stationary steering operation has been detected, the data storage means 111 gather and stores data of various types. The data that has been gathered may, for example, be stored upon a storage medium such as a flash memory. Or the data that has been gathered may also be transmitted to a computer device via a computer network. By storing and analyzing the data during stationary steering operation, for example, it is possible to determine the influence exerted upon various sections of the wheel loader 1, and so on.

The notification means 112 issues a warning when stationary steering operation has been detected. This notification means 112, for example, may output a message such as "Please use only the necessary minimum of stationary steering operation, because it causes wear to the tires" or the like as a text display or as audio.

The braking state detection means 121 detects whether the brake is in the ON state or in the OFF state. And the load state detection means 122 detects whether the bucket 5B is in the fully loaded state or in the unloaded state. The operational state detection means 120 detects the operation state when stationary steering operation is detected, on the basis of the braking state and the load state. This operation state may be divided into four stages, according to combinations of the ON/OFF state of the brake and the filling state of the bucket, as will be described hereinafter. The operational state detection means 120 detects to which of these four stages, which are set in advance, the operational state when stationary steering operation is detected corresponds.

According to the operational state that has been detected, the steering sensitivity alteration means 110 is able to decrease the steering sensitivity. The data storage means 111 is able to store the detected operational state along with data of various types. The notification means 112 is able to alter the contents of its warning according to the operational state that has been detected.

FIG. 2 is an explanatory figure showing the control structure of the hydraulic steering mechanism according to this embodiment. It should be understood that in the following explanation, for the sake of convenience, the stationary steering operation determination means 101 is termed the "stationary steering operation determination unit 101", the vehicle speed detection means 102 is termed the "vehicle speed sensor 102", the steering angle detection means 103 is termed the "steering angle detection unit 103", the sampling period setting means 104 is termed the "sampling period setting unit 104", the vehicle body flexion angle detection means 106 is termed the "vehicle body flexion angle detection sensor 106", the lever operation amount detection means 107 is termed the "lever operation amount detection sensor 107", the steering sensitivity alteration means 110 is termed the "steering sensitivity alteration unit 110", the data storage means 111 is termed the "data storage unit 111", the notification means 112 is termed the "notification unit 112", and the operational state detection means 120 is termed the "operational state detection unit 120".

As described above, steering cylinders 10 are provided at both the left and the right between the front vehicle body portion 2B and the rear vehicle body portion 2A. In the following, the front, rear, left, and right will be distinguished with reference to the point of view of the operator who actuates the steering. The reference symbol 10R will be allocated to the steering cylinder that is positioned on the right side of the vehicle body 2, while the reference symbol 10L will be allocated to the steering cylinder that is positioned on the left side of the vehicle body 2.

When the piston rod of the left side steering cylinder 10L is extended and the piston rod of the right side steering cylinder 10R is retracted, the front vehicle body portion 2B is rotated to the right side of the direction of progression with respect to the rear vehicle body portion 2A. Conversely to this, when the piston rod of the right side steering cylinder 10R is extended and the piston rod of the left side steering cylinder 10L is retracted, the front vehicle body portion 2B is rotated to the left side of the direction of progression with respect to the rear vehicle body portion 2A.

A steering valve 200 is a unit for operating the steering cylinders 10L and 10R, and may be constituted, for example, as a four port three position direction changeover valve. The ports on the output side of this steering valve 200 are connected to the output cylinders 10L and 10R. The steering valve 200 operates to change over its position on the basis of pilot pressure from a pilot valve 220.

When the position of the steering valve 200 is changed over from its middle position to its left position or its right position, pressurized hydraulic fluid from the steering pump 210 is supplied from the steering pump 210 via the steering valve 200 to a predetermined one of the steering cylinders 10L and 10R. And that steering cylinder to which pressurized hydraulic fluid is supplied extends its piston rod.

The pilot valve 220 may, for example, be constituted as a four port three position direction changeover valve, and its ports on its output side are connected to the pilot ports of the steering valve 200, while its ports on its input side are connected to a pilot pump 230.

A steering lever 240 for operating the steering is fitted to the pilot valve 220. According to operation of this steering lever 240, the pilot valve 220 changes over its position and changes its flow area. And, due to change of the flow area, the pilot pressure is adjusted.

The steering lever 240 may be constituted, for example, as a joystick type lever device, and is provided within the driver's cabin 6. The operator actuates the steering by tilting the steering lever 240 to the left and the right.

Figure 3:
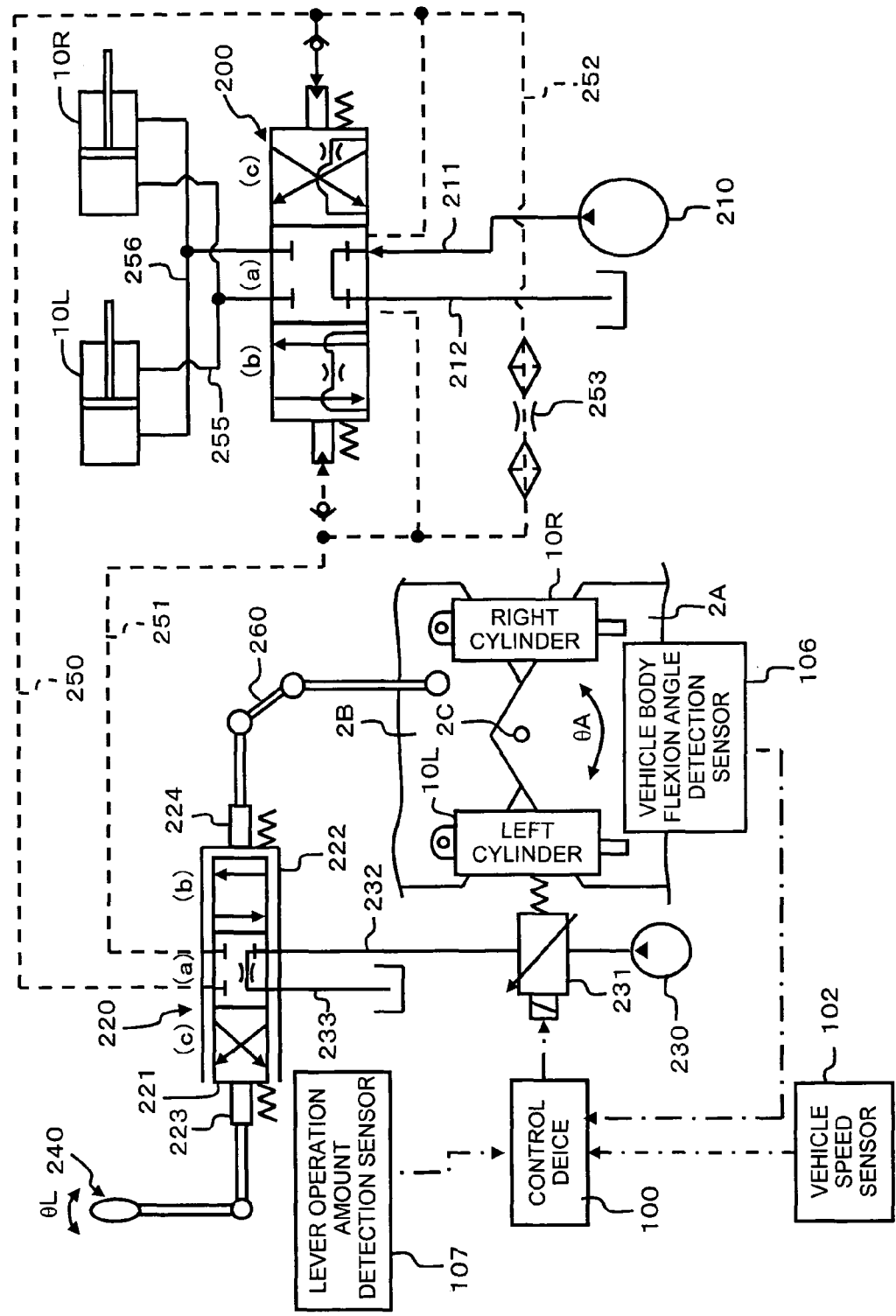
FIG. 3 is an explanatory figure showing a hydraulic circuit of the steering device.

The pilot pump 230 is provided with an electromagnetic type pressure reduction valve 231, as shown in FIG. 3. The pilot pressure is controlled by operation of this pressure reduction valve 231, according to a control signal from a controller 100.

The controller 100 constitutes the main portion of the steering control device shown in FIG. 1. Accordingly, the reference symbol 100 is allocated to the control device, which will now be explained. This controller 100 may, for example, be constituted as a computer device comprising a microprocessor and memory and so on, and is provided within the driver's cabin 6. For example, the vehicle speed sensor 102, the vehicle body flexion angle detection sensor 106, and the lever operation amount detection sensor 107 may all be connected to the controller 100.

The controller 100 comprises a control circuit 100A and a storage unit 100B. The storage unit 100B may consist, for example, of a storage device such as a semiconductor memory or the like, and stores a predetermined program for implementing each of the functions 101, 103, 104, 110, 111, 112, and 120.

According to a command from the steering sensitivity alteration unit 110, the control circuit 100A outputs a control signal to the pilot pump 230 and reduces the pilot pressure. More accurately, it reduces the pilot pressure by supplying a control signal to the electromagnetic type pressure reduction valve 231 that is provided to the pilot pump 230. However this is not limitative; for example, if the pilot pump 230 is constituted as an swash plate type piston pump, then it would be possible to control the pump discharge pressure directly.

FIG. 3 is an explanatory figure showing the circuit structure of the hydraulic steering device. First, the structure of the pilot valve 220 will be explained. To explain the structure briefly, this pilot valve 220 is constituted as a rotary type pilot valve in which an external main body 222 is externally provided to be relatively rotatable about an internal main body 221.

An input shaft 223 is integrally fixed at one end of the internal main body 221, and the steering lever 240 is linked to this input shaft 223. Accordingly, when the steering lever 240 rotates, the internal main body 221 rotates with respect to the external main body 222.

On the other hand, a feedback shaft is integrally fixed to the other end of the external main body 222, and the end portion of a link for feedback 260 is linked to this feedback shaft 224. Accordingly, when the orientation of the front vehicle body portion 2B changes, corresponding thereto, the external main body 222 rotates with respect to the internal main body 221.

The pilot valve 220 has a middle position (a) and left and right steering positions (b) and (c), and has two input ports and two output ports. In the initial state the pilot valve 220 is in its middle position, and, according to the direction of rotation of the steering lever 240, it changes over to either the left steering position (b) or the right steering position (c).

A pilot source pressure line 232 is connected to one of the input ports of the pilot valve 220, and a drain line 233 is connected to the other input port. The pilot source pressure line 232 is connected to the pilot pump 230 via the electromagnetic type pressure reduction valve 231. And the drain line 133 is connected to a tank.

The pilot pump 230 and the electromagnetic type pressure reduction valve 231 and so on constitute a pilot supply source for supplying pilot pressure. The electromagnetic type pressure reduction valve 231 reduces the discharge pressure from the pilot pump 230 according to a control signal from the controller 100, and outputs this as a pilot source pressure. If the pilot source pressure increases then the pilot pressure outputted from the pilot valve 220 also increases, while if the pilot source pressure decreases then the pilot pressure also decreases.

One of the output ports of the pilot valve 220 is connected to one of the pilot ports of the steering valve 200 via one pilot line 250. And the other output port of the pilot valve 220 is connected to the other pilot port of the steering valve 200 via another pilot line 251. Moreover, these pilot lines 250 and 251 are mutually connected together via a communication line 252, partway along which a restrictor 253 is provided.

Accordingly, one pilot pressure supplied from the pilot valve 220 is supplied to a pilot port of the steering valve 200 just as it is, while another is supplied to the other pilot port thereof with its pressure reduced. The steering valve 200 changes over its position according to the pressure difference between these two pilot pressures.

The steering valve 200 may, for example, be constituted as a four port three position direction changeover valve having a middle position (a) and left and right steering positions (b) and (c). One of the input ports of the steering valve 200 is connected to the steering pump 210 via a main hydraulic line 211. And the other input port of the steering valve 200 is connected to a tank via a drain line 212. The output ports of the steering valve 200 are connected to the pressure chambers of the left and right steering cylinders 10L and 10R.

To explain a summary of the basic operation, the pilot valve 220 is in a first middle position. When an actuation angle $\theta L$ is inputted from the operation shaft of the steering lever 240 via a universal joint or the like, the input shaft 223 rotates. And the pilot valve 220 reduces the pilot source pressure according to the difference $\Delta\theta$ between the actuation angle $\theta L$ inputted from the steering lever 240 and the actual steering angle $\theta A$ inputted from the feedback shaft 224, thus generating a pilot pressure.

The steering valve 200 operates according to the pressure difference between the pilot pressures inputted to its pilot ports, and thereby controls the flow rate and direction of the pressurized hydraulic fluid discharged from the steering pump 210, thus extending and retracting the steering cylinders 10L and 10R.

The steering angle $\theta A$ changes according to the extension and retraction of the left and right cylinders 10L and 10R. This steering angle $\theta A$ is detected via the link for feedback 260, and is transmitted to the pilot valve 220. And the pilot valve 220 stops outputting pilot pressure when the difference $\Delta\theta(=|\theta A-\theta L|)$ becomes zero.

In more detail, when the pilot valve 220 is changed over to its right steering position (b), the steering valve 200 is also changed over to its right steering position (b). Due to this, the left cylinder 10L expands and the right cylinder 10R retracts, and the orientation of the front vehicle body portion 2B changes to the right side. And, when the pilot valve 220 is changed over to its left steering position (c), the steering valve 200 is also changed over to its left steering position (c). Due to this, the right cylinder 10R expands and the left cylinder 10L retracts, and the orientation of the front vehicle body portion 2B changes to the left side.

Figure 4:
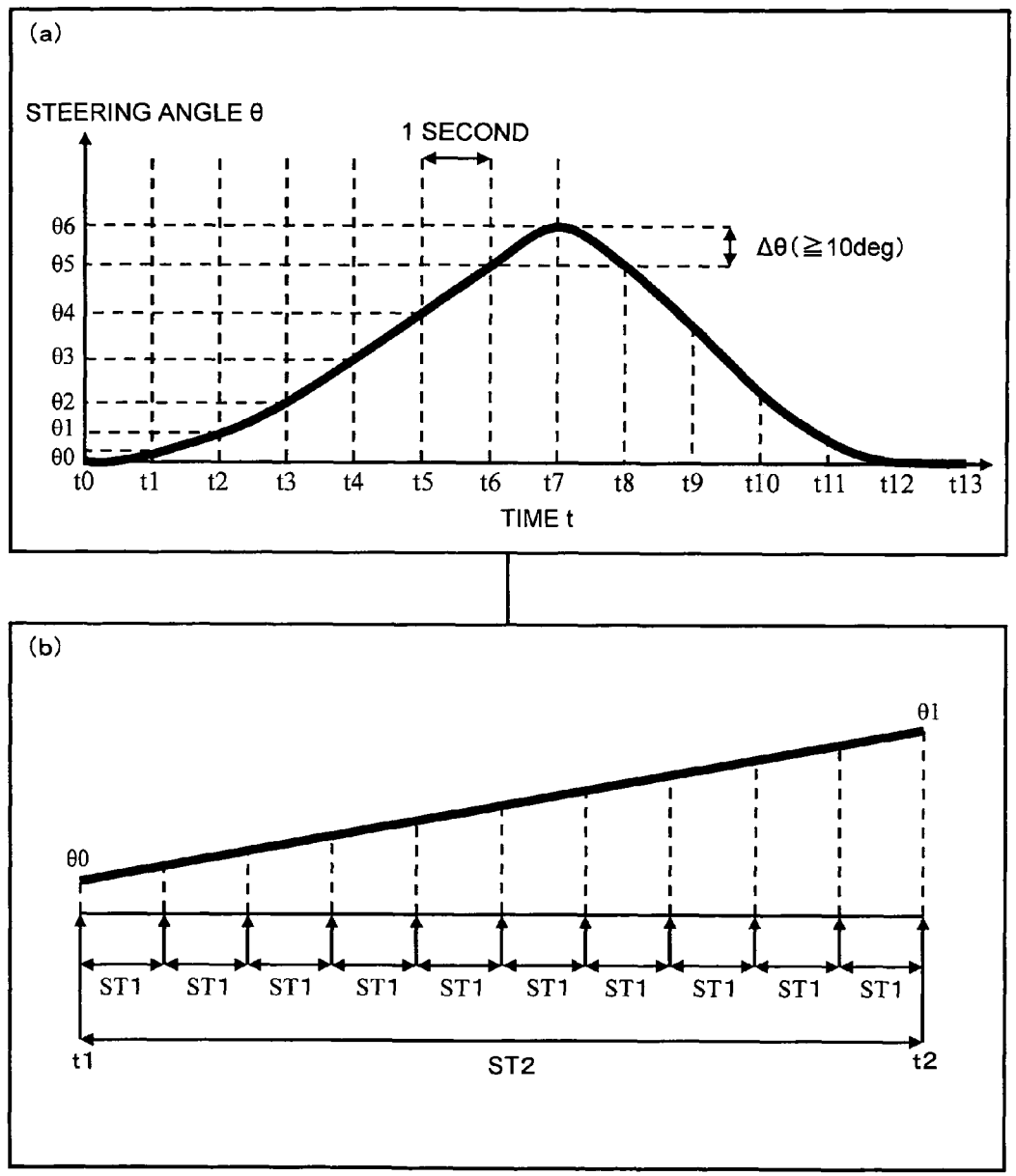
FIG. 4 is a characteristic figure showing the relationship between a cycle at which steering angle is detected, and a cycle at which an amount of change of steering angle is determined.

FIG. 4 is an explanatory figure showing the method for detection of the steering angle. FIG. 4(a) shows the change over time of the steering angle $\theta$. The horizontal axis shows time (in seconds), while the vertical axis shows the steering angle (in degrees).

When the operator actuates the steering in either the left or the right direction, then the steering angle changes, as shown by the thick line in FIG. 4(a). The steering angle at the time point t0 will be termed 0, the steering angle at the time point t1 after one second has elapsed from t0 will be termed $\theta 0$, the steering angle at the time point t2 after one second has elapsed from t1 will be termed $\theta 1$, and the steering angle at the time point t3 after one second has elapsed from t2 will be termed $\theta 2$; and the same subsequently.

In the example shown in FIG. 4(a), during the one second from the time point t6 to the time point t7, the steering angle is changing by 10° or more ($\Delta\theta=|\theta 6-\theta 5|\geq 10°$). In this embodiment, as described hereinafter, if the wheel loader 1 is substantially stationary, it is determined that stationary steering operation is being performed when the steering angle has changed by 10° or more during one second.

The period at which the vehicle speed is detected will be termed the first sampling period, the period at which the steering angle is detected will be termed the second sampling period, and the period at which it is determined whether or not stationary steering operation is taking place will be termed the third sampling period. The first sampling period which is the detection cycle for the vehicle speed and the second sampling period which is the detection cycle for the steering angle may be the same, or may be different. In the following explanation the same symbol ST1 will be used for the steering angle detection period and the vehicle speed detection period.

Although in FIG. 4(a) the situation is shown as though the steering angle is being detected every one second, actually, as shown in FIG. 4(b), the vehicle body flexion angle detection sensor 106 detects the steering angle at a sampling period ST1 which is adequately shorter than one second.

In other words, the sensor 106 detects the steering angle at a comparatively short period ST1, for example 10 msec or the like. However, the controller 100 makes a determination as to whether or not the steering angle $\theta$ has changed by a reference angle (for example 10°) or more at a period ST2 (for example one second) which is longer than the detection period ST1 of the sensor.

In this manner, in this embodiment, the sensing period ST1 (the first sampling period, the second sampling period) and the determination period ST2 (the third sampling period) are different, and change of the steering angle is determined at the period ST2 which is adequately longer than the sensing period ST1. Accordingly, in this embodiment, it is possible to detect the steering angle while eliminating negative influence due to electrical noise and so on as much as possible. Moreover, it is possible to eliminate accidental change of the steering angle, and to detect movement due to the will of the operator.

Although this is not particularly shown in the figure, it should be understood that the vehicle speed sensor 102 also detects the speed of this wheel loader 1 at a period ST1 that is comparatively short. The controller 100 makes a determination as to whether or not the vehicle speed is less than or equal to a reference vehicle speed at the period ST2 that is comparatively long. The way in which this determination as to whether or not the vehicle speed is less than or equal to the reference vehicle speed is performed at a period ST2 which is adequately longer than the period ST1 at which the vehicle speed sensor 102 detects the vehicle speed (i.e. the sampling period) will easily be understood from FIG. 4 and the description related to FIG. 4.

Figure 5:
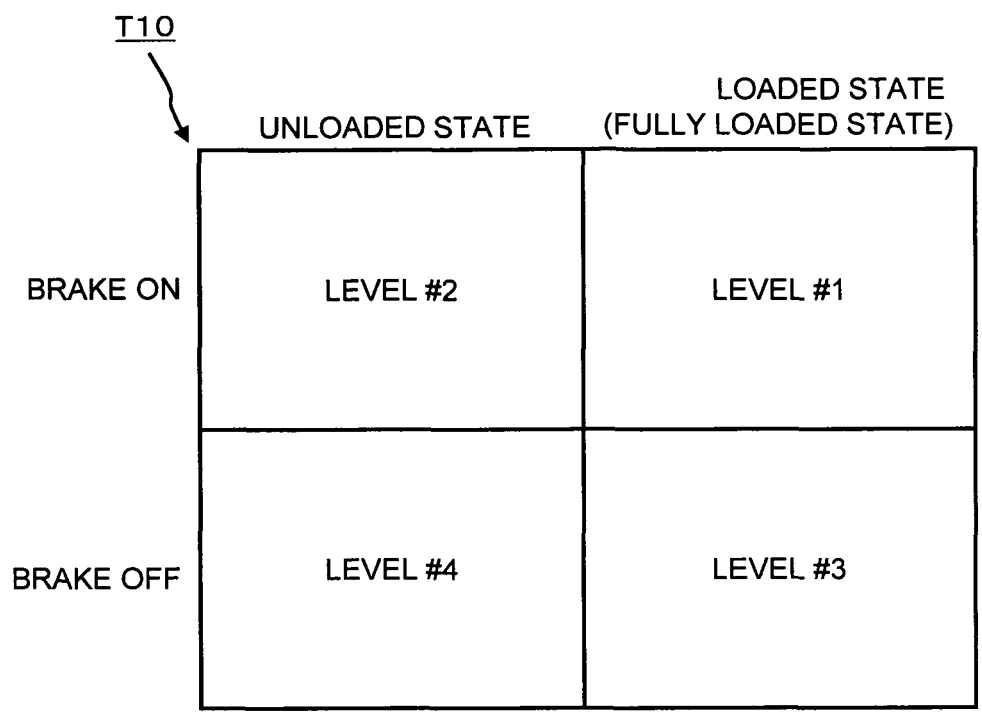
FIG. 5 is an explanatory figure that subdivides the operational state during stationary steering operation, according to the operational state of a brake and the load state of a bucket.

FIG. 5 shows a table T10 that subdivides the operational state during stationary steering operation. It is possible to distinguish the operational state when the steering is being operated in the stationary steering mode into a plurality of stages, on the basis of a plurality of indicators, i.e. the load state and the braking state. It should be understood that, in this embodiment, the operational state during stationary steering operation is not considered. In another embodiment that will be described hereinafter, various types of control are executed according to the operational state during stationary steering operation.

The load state means the load state of the bucket 5B. This load state can either be the unloaded state or the loaded state. In normal circumstances, a way of operating in which the bucket 5B is only half loaded is not employed, but rather a full load such as earth or sand or the like is loaded into the bucket 5B. Accordingly, it is also possible to term the loaded state the "fully loaded state". This is not limitative; it would also be acceptable to arrange to calculate the load weight within the bucket 5B on the basis of the pressure of the boom cylinder 11 or the like, and to distinguish different load states for various load weights. For example, it would be possible to subdivide the load state into three or more states, such as unloaded to less than 10% load amount, 10% load amount to less than 30% load amount, 30% load amount to less than 70% load amount, and 70% load amount to the fully loaded state.

The braking state means the operational state of the brake. This braking state can either be the brake ON state or the brake OFF state. This is not limitative; it would also be acceptable, for example, to provide a brake pedal sensor that detects the amount by which the brake pedal is stepped upon, and to subdivide the braking state according to the amount of operation of the brake pedal.

In this embodiment, by combining together the load state and the braking state, each of which has two states, the operational state during stationary steering operation is classified into one of four stages (Level #1 through Level #4 in FIG. 5).

In the first stage (Level #1), the bucket 5B is in the fully loaded state, and moreover the brake is in the state of operating. When stationary steering operation is performed in the operation state of this first stage, the amount of wear upon the tires 3 is greatest.

In the second stage (Level #2), the bucket 5B is in the unloaded state, and moreover the brake is in the state of operating. When stationary steering operation is performed in the operation state of this second stage, the amount of wear upon the tires 3 is next largest to the case with the first stage.

In the third stage (Level #3), the bucket 5B is in the fully loaded state, and moreover the brake is in the state of not operating. When stationary steering operation is performed in the operation state of this third stage, the amount of wear upon the tires 3 is next largest to the case with the first stage. It should be understood that the size relationship of the amount of wear with the second stage and the amount of wear with the third stage depends upon circumstances.

And in the fourth stage (Level #4), the bucket 5B is in the unloaded state, and moreover the brake is in the state of not operating. When stationary steering operation is performed in the operation state of this fourth stage, the amount of wear upon the tires 3 is least.

Figure 6:
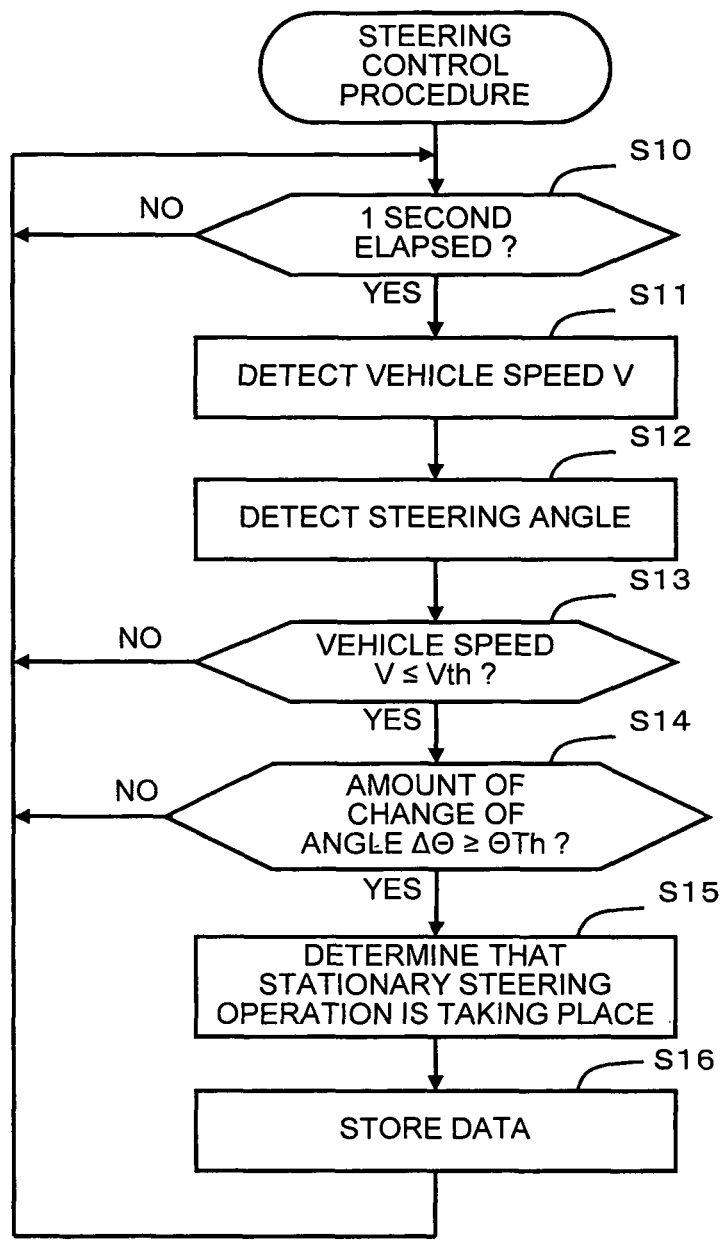
FIG. 6 is a flow chart of a steering control procedure.

FIG. 6 is a flow chart showing the steering control procedure according to this embodiment. As a decision cycle, the controller 100 makes a decision as to whether or not the interval of one second has elapsed from the previous time of decision (a step S10). This predetermined time interval corresponds to the decision cycle ST2 shown in FIG. 4. In other words, this process is performed repeatedly at a determination cycle ST2.

If one second which is the predetermined time interval has elapsed (YES in the step S10), then the controller 100 detects the vehicle speed V on the basis of the signal from the vehicle speed sensor 102 (a step S11), and also detects the steering angle θ on the basis of the signal from the vehicle body flexion angle detection sensor 106 (a step S12).

Then the controller 100 makes a decision as to whether or not the vehicle speed V is less than or equal to a reference vehicle speed Vth which is set in advance (a step S13). This reference vehicle speed Vth may, for example, be set to around one kilometer per hour. Moreover, the controller 100 makes a decision as to whether or not the amount of change Δθ of the steering angle is greater than or equal to a reference angle θTh which is set in advance (a step S14). This reference angle θTh may, for example, be set to around 10°. In other words, the controller 100 makes a decision as to whether or not the vehicle speed V is less than or equal to the reference vehicle speed Vth, and a decision as to whether or not the amount of change Δθ of the steering angle is greater than or equal to the reference angle θTh, at the predetermined period ST1.

If the vehicle speed V is less than or equal to the reference vehicle speed Vth (YES in the step S13), and moreover the amount of change Δθ of the steering angle is greater than or equal to the reference angle θTh (YES in the step S14), then this is a situation in which, in the state with the wheel loader 1 substantially stationary, the steering has been actuated by greater than or equal to the predetermined amount.

Thus, the controller 100 determines that this is a case in which stationary steering operation of the steering has been performed (a step S15). And the controller 100 gathers and stores data of various types during stationary steering operation (a step S16).

Figure 7:
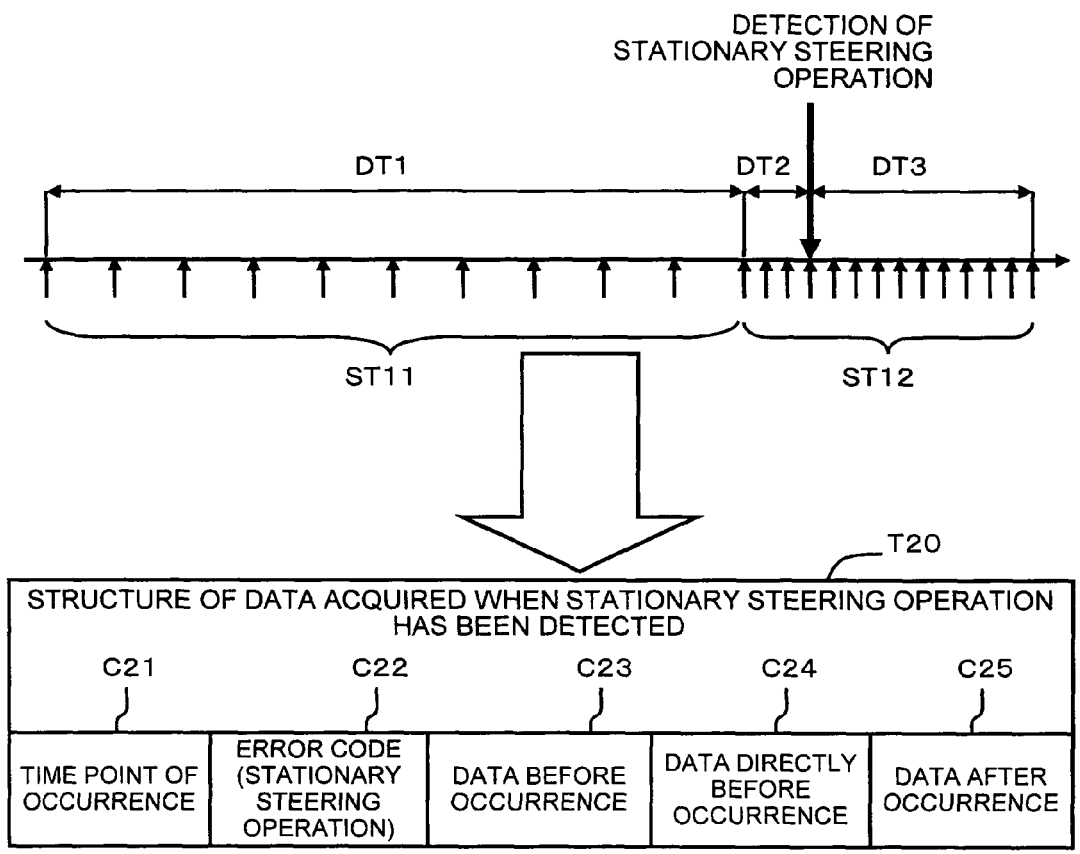
FIG. 7 is an explanatory figure showing the state of data gathered before and after stationary steering operation.

FIG. 7 is a figure for explanation of the data gathered and stored during stationary steering operation. As shown by the thick arrow sign at the upper portion of the figure, when stationary steering operation has been detected, the data before and after the time point of detection of stationary steering operation are both stored.

DT1 and DT2 are gathered as the data before the stationary steering operation, and DT3 is gathered as the data after the stationary steering operation. The first data DT1 before the stationary steering operation is gathered and stored at a comparatively long period ST11 of, for example, 10 seconds or the like. And the second data DT2 before the stationary steering operation is gathered and stored at a comparatively short period ST12 of, for example, 1 second or the like. Moreover, the data DT3 after the stationary steering operation gathered and stored at the comparatively short period ST12 of 1 second. In other words, the data directly before and directly after the stationary steering operation is gathered and stored at a comparatively short period.

An example of the data gathered during stationary steering operation is shown as the table T20. As an example, this table T20 establishes a correspondence between and manages the time point of occurrence C21, an error code C22, the data before occurrence C23, the data directly before occurrence C24, and the data after occurrence C25.

In the time point of occurrence C21, the time point at which the stationary steering operation has been detected is set. In the error code C22, an error code that signifies stationary steering operation is set. In the data before occurrence C23, the data DT1 described above is stored. In the data directly before occurrence C24, the data DT2 described above is stored. And in the data after occurrence C25, the data DT3 described above is stored.

As the data that is gathered before and after the occurrence of stationary steering operation, for example, the value on a service meter, the engine speed, the fuel injection amount, the blow-by pressure, the boost pressure, the engine coolant temperature, the exhaust temperature, the oil temperature, the oil pressure, the vehicle speed and so on may be mentioned. These various types of data are gathered and stored as each of DT1, DT2, and DT3.

Since it has the structure described above, this embodiment has the following advantageous effects. In this embodiment, it is decided that stationary steering operation is taking place if the vehicle speed V is less than or equal to the reference vehicle speed Vth, and moreover the steering angle has changed by at least the reference angle θth. Accordingly, it is possible to determine whether or not the steering of this wheel loader 1 is being operated in the stationary steering mode.

And, in this embodiment, this determination as to whether or not operation in the stationary steering mode is taking place is performed at the determination cycle ST2 (for example 1 second) which is longer than the cycle for detection ST1 (for example 10 msec). Accordingly, it is possible to detect the presence or absence of stationary steering operation in a stable manner while reducing the influence of noise and the like.

Embodiment 2

Figure 8:
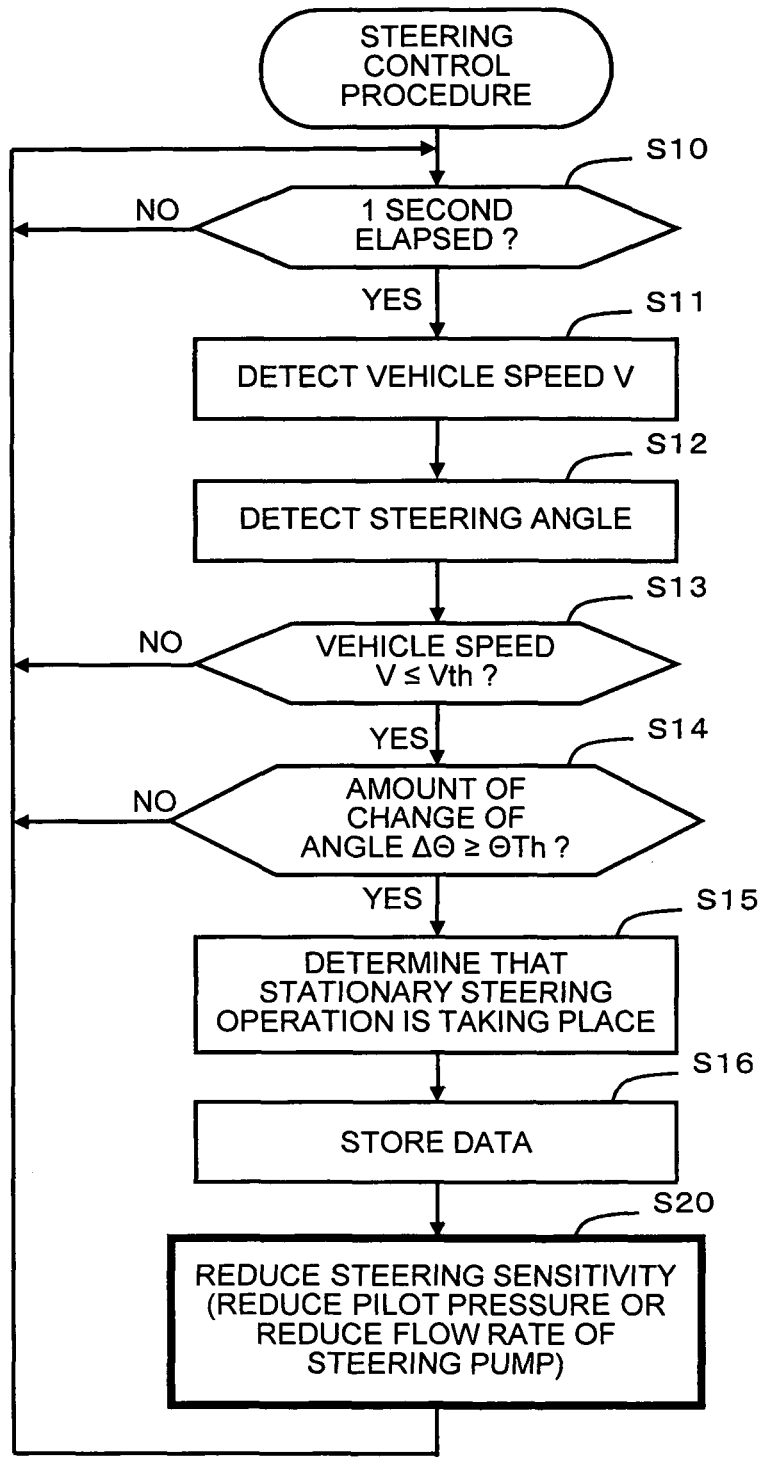
FIG. 8 is a flow chart of a steering control procedure according to a second embodiment.

In the following, other embodiments of the present invention will be explained. The various embodiments described below are equivalent to variants of the first embodiment. Accordingly, the explanation will concentrate upon the points of difference with the first embodiment. FIG. 8 is a flow chart of the steering control method according to this second embodiment.

When the controller 100 determines that stationary steering operation is taking place (the step S15), it stores the data before and after stationary steering operation (the step S16), and also reduces the sensitivity of the steering using the steering sensitivity alteration unit 110 (a step S20).

The controller 100 may reduce the sensitivity of the steering by using any one or a plurality among a plurality of methods. The steering sensitivity means the speed at which the tires 3 change their direction when the operator actuates the steering lever 240. And reduction of the steering sensitivity means that, when the operator actuates the steering lever 240, it takes some time until the actual orientation of the tires 3 changes.

In a first method of reducing the steering sensitivity, the pilot pressure is reduced. For example, the controller 100 may reduce the steering sensitivity by outputting a control signal to the pressure reduction valve 231 to reduce the pilot pressure. When the pilot pressure drops, the steering sensitivity reduces since the speed of operation of the steering valve 200 decreases. It should be understood that it would also be acceptable to arrange to build the pilot pump 230 as an swash plate type piston pump, and to adjust the angle of inclination of its plate.

And, as a second method of reducing the steering sensitivity, the discharge flow rate of the steering pump 210 is reduced. For example, the steering pump 210 may be built as an swash plate type piston pump, and the angle of inclination of its plate may be adjusted.

It should be understood that, while an swash plate type piston pump has been shown as an example of a pump whose discharge pressure (flow rate) can be adjusted, this is not limitative; it would also be possible to employ a pump of some other type.

This embodiment having the above structure provides similar advantageous operational effects to the first embodiment. Furthermore, in this embodiment, when stationary steering operation of the steering has been detected, it is possible to suppress this stationary steering operation, since the steering sensitivity is reduced. By sensing the decrease in steering sensitivity, the operator is aware that stationary steering operation is inappropriate actuation, and subsequently will actuate the steering more appropriately. Furthermore, by reducing the steering sensitivity during stationary steering operation, it is possible to reduce the amount of tire wear during stationary steering operation.

It should be understood that while, as the method for reducing the steering sensitivity, reduction of the pilot pressure or reduction of the discharge amount of the steering pump 210 have been mentioned, the present invention is not limited to those methods.

Embodiment 3

Figure 9:
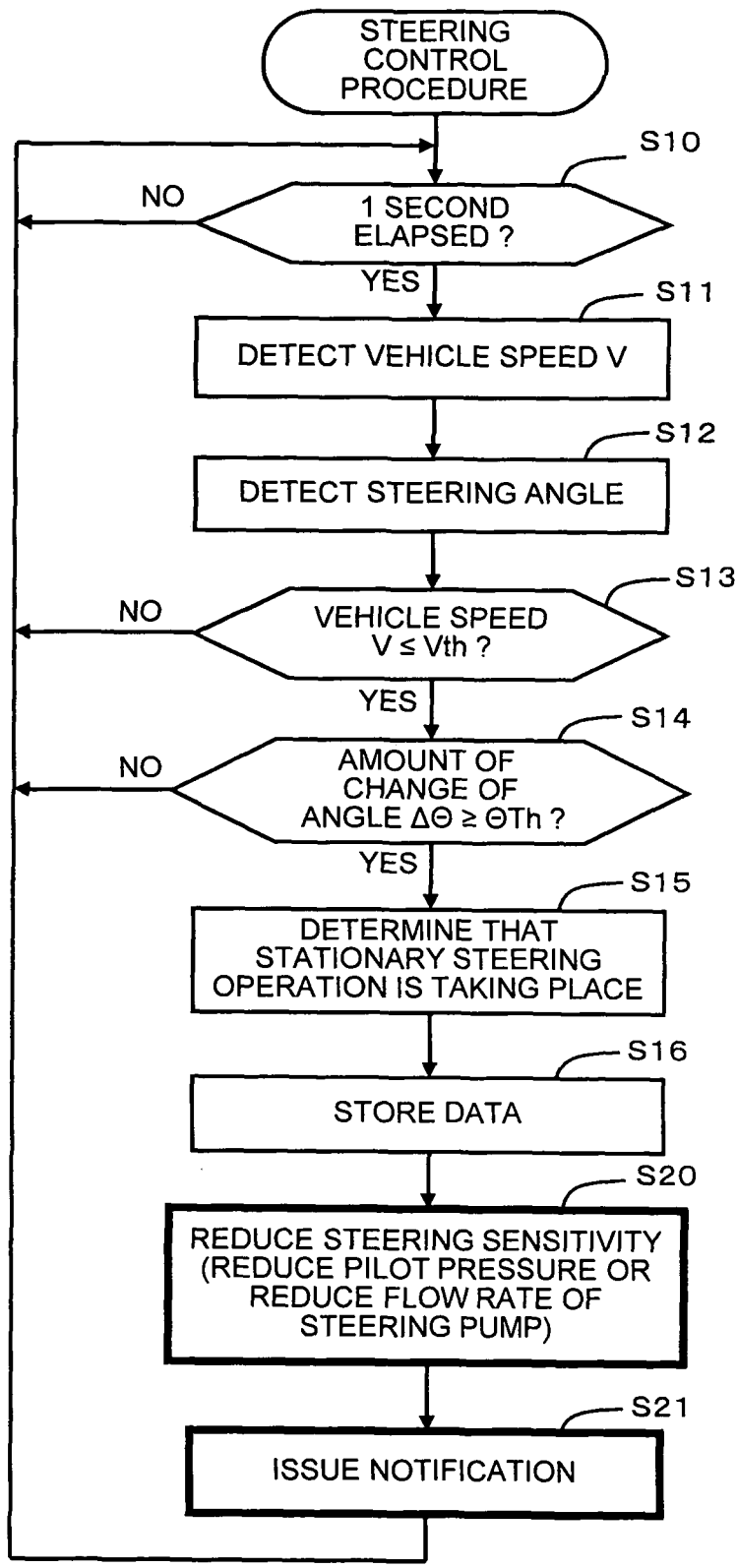
FIG. 9 is a flow chart of a steering control procedure according to a third embodiment.

A third embodiment will now be explained on the basis of FIG. 9. In this third embodiment, an alarm is outputted if stationary steering operation is discovered. FIG. 9 is a flow chart showing the steering control procedure according to this embodiment.

In a similar manner to the second embodiment, when the controller 100 detects stationary steering operation (the step S15), it stores the predetermined data before and after the stationary steering operation (the step S16), and reduces the steering sensitivity (the step S20). Moreover, the controller 100 notifies the operator to the effect that stationary steering operation has been detected (a step S21). This notification may be performed by screen display of a warning text that has been prepared in advance, or by reading a warning message aloud.

It should be understood that it would also be acceptable to provide a structure in which the fact that stationary steering operation has been detected is notified to the manager or the owner of the wheel loader 1 (hereinafter termed the manager or the like). It would be acceptable to provide a structure in which both the operator and the manager or the like are warned in relation to stationary steering operation, or one in which only one of the operator and the manager or the like is thus warned.

This embodiment also provides similar advantageous operational effects to the first embodiment and the second embodiment. Furthermore, in this embodiment, since it is arranged to issue a warning if stationary steering operation is detected, accordingly it is possible to reduce the frequency of stationary steering operation, and thus to diminish the cost of maintenance.

Embodiment 4

Figure 10:
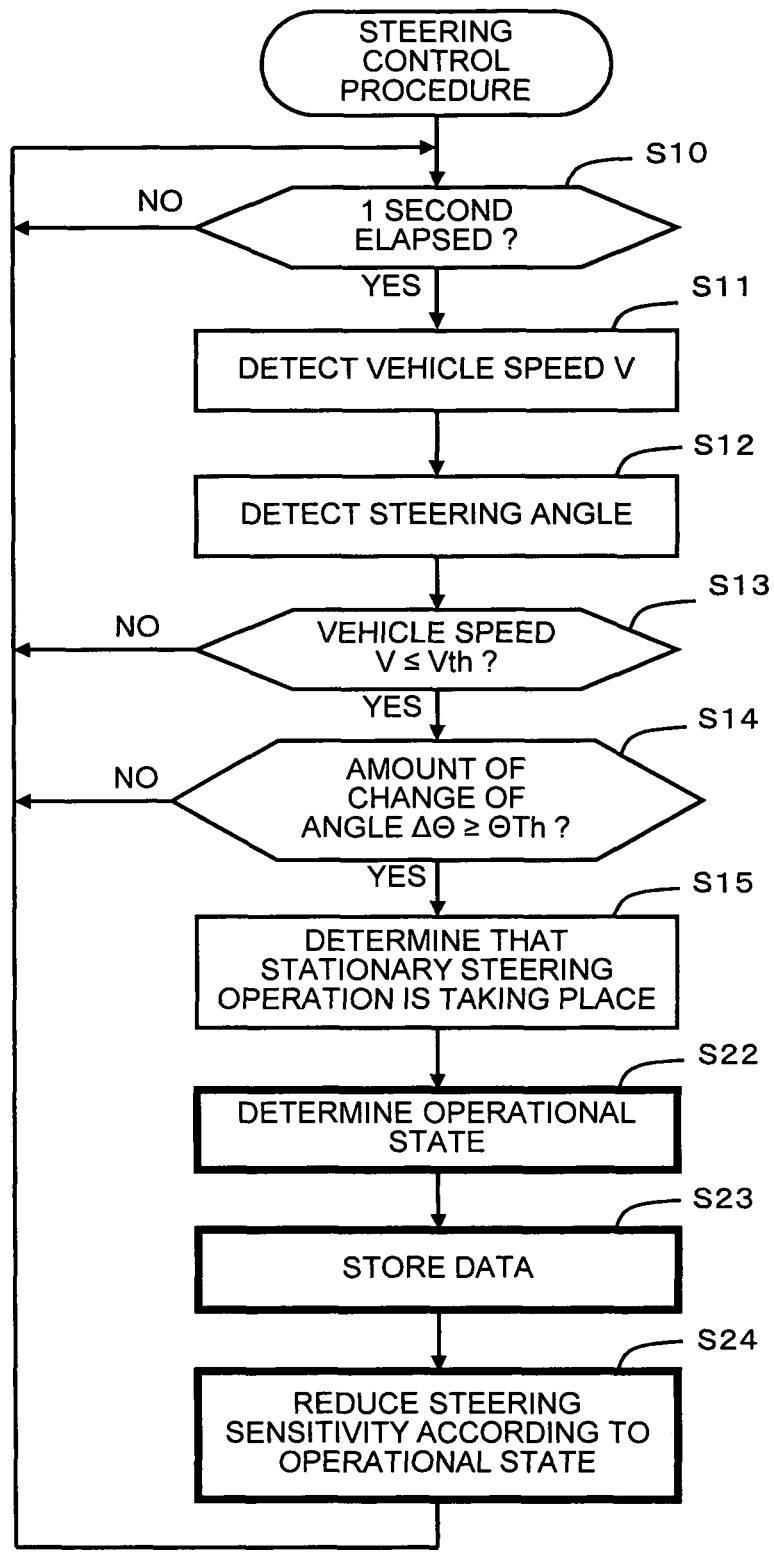
FIG. 10 is a flow chart of a steering control procedure according to a fourth embodiment.

A fourth embodiment will now be explained on the basis of FIG. 10. In this fourth embodiment, the sensitivity of the steering is decreased according to the operational state during stationary steering operation. FIG. 10 is a flow chart showing the steering control procedure according to this embodiment.

When the controller 100 detects stationary steering operation (the step S15), it determines the operational state during stationary steering operation (a step S22). In other words, as explained with FIG. 5, during stationary steering operation, the controller 100 distinguishes which of the four stages of operational state is the case, on the basis of the ON/OFF state of the brake and the load state of the bucket 5B (the step S22).

The control device stores the operational state determined in the step S22 together with the predetermined data (a step S23), and also reduces the steering sensitivity according to the operational state determined in the step S22 (a step S24).

FIG. 11 shows a table T30 for controlling the steering sensitivity. The controller 100 is able to reduce the steering sensitivity according to the various stages of operational state, by using this steering sensitivity control table T30.

The steering sensitivity control table T30 establishes a correspondence between and manages the reduction amount of the steering sensitivity and each of the stages of operational state. For example, in the case of the first stage (Level #1), the pilot pressure is set to ⅓ of its normal value. In the case of either the second stage (Level #2) or the third stage (Level #3), the pilot pressure is set to ½ of its normal value. And, in the case of the fourth stage (Level #4), the pilot pressure is set to ⅔ of its normal value.

As described above it is the first stage in which, during stationary steering operation, the wear upon the tires 3 is exceedingly great, while the fourth stage is the one in which the wear is the least. And the second stage and the third stage are positioned in between the first stage and the fourth stage. Thus the pilot pressure is reduced to ⅓ in the first stage in which the amount of wear is the greatest, so that the steering sensitivity is most reduced. And, in the fourth stage in which the amount of wear is the least, the pilot pressure is reduced to ⅔.

This embodiment also provides similar advantageous operational effects to the first embodiment and the second embodiment. Furthermore since, in this embodiment, during stationary steering operation, the steering sensitivity is controlled according to the operational state, accordingly it is possible to perform steering control during stationary steering operation in a more appropriate manner.

Embodiment 5

Figure 12:
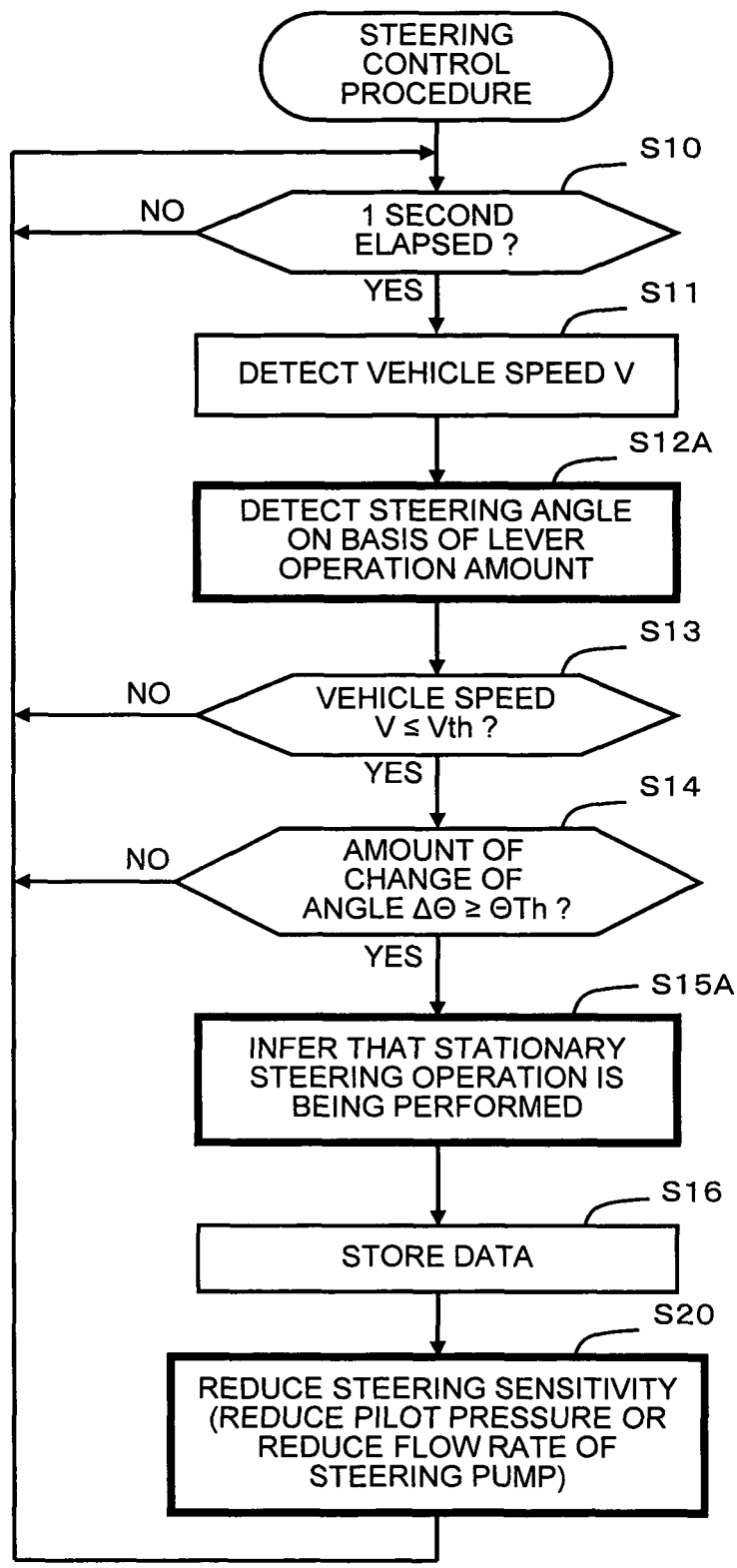
FIG. 12 is a flow chart of a steering control procedure according to a fifth embodiment.

A fifth embodiment will now be explained on the basis of FIG. 12. In this fifth embodiment stationary steering operation is detected even before stationary steering operation is actually being performed, by using the lever operation amount detection sensor 107 instead of the vehicle body flexion angle detection sensor 106. FIG. 12 is a flow chart of the steering control procedure according to this fifth embodiment.

The controller 100 detects the steering angle on the basis of the signal from the lever operation amount detection sensor 107 (a step S12A). And the control device infers that stationary steering operation is being performed (a step S15A) if the vehicle speed V is less than or equal to the reference vehicle speed Vth (YES in the step S13), and moreover the amount of change Δθ of the steering angle is greater than or equal to the reference angle θTh (YES in the step S14).

When the controller 100 infers the start of stationary steering operation, it stores the data (the step S16), and also reduces the steering sensitivity (the step S20).

This embodiment also provides similar advantageous operational effects to the first embodiment and the second embodiment. Furthermore, in this embodiment, since stationary steering operation is detected on the basis of the operation amount of the steering lever 240 and the vehicle speed, accordingly it is possible to detect that operation in stationary steering mode will occur, and it is possible to reduce the steering sensitivity, in advance even before the stationary steering operation is actually started.

It should be understood that the present invention is not limited to the embodiments described above. A person skilled in the art will be able to perform various additions and/or changes and so on, within the scope of the present invention.

EXPLANATION OF THE REFERENCE SYMBOLS

1: wheel loader; 2A: rear vehicle body portion; 2B: front vehicle body portion; 2C: link portion; 3: tires; 4: machine compartment; 5: working machine; 5A: boom; 5B: bucket; 6: driver's cabin; 10,10L,10R: steering cylinders; 11: boom cylinder; 12: bucket cylinder; 100: controller 100A: control circuit; 100B: storage unit; 101: operation determination means (operation determination unit); 102: vehicle speed detection means (vehicle speed detection sensor); 103: steering angle detection means; 104: sampling period setting means (sampling period setting unit); 106: vehicle body flexion angle detection means (vehicle body flexion angle detection sensor); 107: lever operation amount detection means (lever operation amount detection sensor); 110: steering sensitivity alteration means (steering sensitivity alteration unit); 111: data storage means (data storage unit); 112: notification means (notification unit); 120: operational state detection means (operational state detection unit); 121: braking state detection means; 122: load state detection means; 200: steering valve; 210: steering pump; 211: main hydraulic line; 212: drain line; 220: pilot valve; 221: internal main body; 222: external main body; 223: input shaft; 224: feedback shaft; 230: pilot pump; 231: electromagnetic type pressure reduction valve; 232: pilot source pressure line; 233: drain line; 240: steering lever; 250, 251: pilot line; 252: communication line; 253: restrictor; 260: link for feedback.

The invention claimed is:

1. A steering control device of a working vehicle that controls the steering operation of a working vehicle, comprising:
a vehicle speed detection means that detects the vehicle speed repeatedly at a first sampling period that is set in advance;
a steering angle detection means that detects the steering angle repeatedly at a second sampling period that is set in advance; and
a stationary steering operation determination means for making a decision as to whether or not the steering is being operated in stationary steering mode, that makes its decision as to operation in stationary steering mode on the basis of said vehicle speed and said steering angle repeatedly at a third sampling period that is set longer than said first sampling period and said second sampling period.

2. A steering control device of a working vehicle according to claim 1, further comprising a steering sensitivity alteration means for changing the sensitivity of steering operation, and wherein said steering sensitivity alteration means decreases the sensitivity of steering operation when it has been decided by said stationary steering operation determination means that said stationary steering operation is taking place.

3. A steering control device of a working vehicle according to claim 2, wherein said steering angle detection means is either a vehicle body flexion angle detection means for detecting flexion of the vehicle body, or a lever operation amount detection means for detecting the operation amount of a steering lever.

4. A steering control device of a working vehicle according to claim 3, further comprising a data storage means for storing the decision result of said stationary steering operation determination means.

5. A steering control device of a working vehicle according to claim 2, further comprising a data storage means for storing the decision result of said stationary steering operation determination means.

6. A steering control device of a working vehicle according to claim 2, further comprising a notification means for issuing an alarm if it has been decided by said stationary steering operation determination means that said stationary steering operation is taking place.

7. A steering control device of a working vehicle according to claim 2, further comprising:
an operational state detection means that, when it has been decided by said stationary steering operation determination means that said stationary steering operation is taking place, detects to which of a plurality of subdivisions that are set in advance the operational state belongs, on the basis of the operational state of a brake and the load weight; and
a steering sensitivity alteration means that reduces the sensitivity of steering operation according to said operational state, by reducing either or both of the discharge flow rate of a steering pump, or a pilot pressure for controlling a steering valve.

8. A steering control device of a working vehicle according to claim 2, further comprising an operational state detection means for detecting the operational state on the basis of operational state of a brake and the load weight, when it has been decided by said stationary steering operation determination means that said stationary steering operation is taking place.

9. A steering control device of a working vehicle according to claim 8, wherein said steering angle detection means is either a vehicle body flexion angle detection means for detecting flexion of the vehicle body, or a lever operation amount detection means for detecting the operation amount of a steering lever.

10. A steering control device of a working vehicle according to claim 9, further comprising a data storage means for storing the decision result of said stationary steering operation determination means.

11. A steering control device of a working vehicle according to claim 8, further comprising a data storage means for storing the decision result of said stationary steering operation determination means.

12. A steering control device of a working vehicle according to claim 8, further comprising a notification means for issuing an alarm if it has been decided by said stationary steering operation determination means that said stationary steering operation is taking place.

13. A steering control device of a working vehicle according to claim 8, further comprising:
an operational state detection means that, when it has been decided by said stationary steering operation determination means that said stationary steering operation is taking place, detects to which of a plurality of subdivisions that are set in advance the operational state belongs, on the basis of the operational state of a brake and the load weight; and
a steering sensitivity alteration means that reduces the sensitivity of steering operation according to said operational state, by reducing either or both of the discharge flow rate of a steering pump, or a pilot pressure for controlling a steering valve.

14. A steering control device of a working vehicle according to claim 1, wherein said steering angle detection means is either a vehicle body flexion angle detection means for detecting flexion of the vehicle body, or a lever operation amount detection means for detecting the operation amount of a steering lever.

15. A steering control device of a working vehicle according to claim 14, further comprising a data storage means for storing the decision result of said stationary steering operation determination means.

16. A steering control device of a working vehicle according to claim 1, further comprising a data storage means for storing the decision result of said stationary steering operation determination means.

17. A steering control device of a working vehicle according to claim 1, further comprising a notification means for issuing an alarm if it has been decided by said stationary steering operation determination means that said stationary steering operation is taking place.

18. A steering control device of a working vehicle according to claim 1, further comprising:
an operational state detection means that, when it has been decided by said stationary steering operation determination means that said stationary steering operation is taking place, detects to which of a plurality of subdivisions that are set in advance the operational state belongs, on the basis of the operational state of a brake and the load weight; and
a steering sensitivity alteration means that reduces the sensitivity of steering operation according to said operational state, by reducing either or both of the discharge flow rate of a steering pump, or a pilot pressure for controlling a steering valve.

19. A steering control method that controls the steering operation of a working vehicle, comprising a vehicle speed detection means that detects the vehicle speed repeatedly at a first sampling period that is set in advance, and a steering angle detection means that detects the steering angle repeatedly at a second sampling period that is set in advance, in which are executed:
a step of making a decision as to whether or not a third sampling period that is set longer than said first sampling period and said second sampling period has elapsed;
a step of, when said third sampling period has elapsed, making a decision as to whether or not the vehicle speed being detected by said vehicle speed detection means is less than or equal to a reference vehicle speed that is set in advance;
a step of, when said third sampling period has elapsed, making a decision as to whether or not the steering angle being detected by said steering angle detection means is changing by greater than or equal to a reference angle that is set in advance; and
a step of deciding that stationary steering operation is being performed, if it has been decided that said vehicle speed is less than or equal to said reference vehicle speed and moreover said steering angle is greater than or equal to said reference angle.

* * * * *